(12) United States Patent
Sasage et al.

(10) Patent No.: US 8,376,075 B2
(45) Date of Patent: Feb. 19, 2013

(54) SADDLE-RIDE ELECTRIC VEHICLE

(75) Inventors: Taiki Sasage, Saitama (JP); Masahiko Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 662 days.

(21) Appl. No.: 12/560,970

(22) Filed: Sep. 16, 2009

(65) Prior Publication Data
US 2010/0078236 A1   Apr. 1, 2010

(30) Foreign Application Priority Data

Sep. 30, 2008 (JP) ................. 2008-254761
Sep. 30, 2008 (JP) ................. 2008-254810
Sep. 30, 2008 (JP) ................. 2008-255161

(51) Int. Cl.
   *B60R 16/04*   (2006.01)
   *B62D 61/02*   (2006.01)
(52) U.S. Cl. .................... 180/68.5; 180/220
(58) Field of Classification Search .......... 180/68.5, 180/218, 219, 220
See application file for complete search history.

(56) References Cited

U.S. PATENT DOCUMENTS

| | | | | |
|---|---|---|---|---|
| 3,773,131 A * | 11/1973 | Jaulmes | ...... | 180/206.5 |
| 5,305,513 A * | 4/1994 | Lucid et al. | ...... | 29/402.08 |
| 5,421,427 A * | 6/1995 | Ogawa et al. | ...... | 180/220 |
| 5,730,243 A * | 3/1998 | Koike et al. | ...... | 180/220 |
| 6,095,270 A * | 8/2000 | Ishikawa | ...... | 180/68.5 |
| 6,722,460 B2 * | 4/2004 | Yang et al. | ...... | 180/220 |
| 2001/0000394 A1 * | 4/2001 | Whittaker | ...... | 180/220 |
| 2009/0242298 A1 * | 10/2009 | Guss et al. | ...... | 180/68.5 |

FOREIGN PATENT DOCUMENTS

| | | |
|---|---|---|
| EP | 0539269 A1 | 4/1993 |
| FR | 2865183 A1 | 7/2005 |
| JP | 5-105143 A | 4/1993 |
| JP | 2003-182669 A | 7/2003 |

* cited by examiner

*Primary Examiner* — John R Olszewski
(74) *Attorney, Agent, or Firm* — Birch, Stewart, Kolasch & Birch, LLP

(57) ABSTRACT

To dispose a large battery in a saddle-ride electric vehicle equipped with a head pipe steerably supporting a front fork with the front wheel journaled to a lower end portion and a steering handlebar, a main frame extending downward and rearward from the head pipe, and an electric motor generating power for rotatively driving a rear wheel. The battery supplying electric power to an electric motor is disposed in a space S1 that is surrounded by a down frame connected to the head pipe or a front end portion of the main frame 14 and extending downward, a pivot frame connected to the rear end portion of the main frame and extending downward, and the main frame. The electric motor is disposed on a side of the rear wheel rather than in the space S1.

20 Claims, 11 Drawing Sheets

SADDLE-RIDE ELECTRIC VEHICLE

CROSS-REFERENCE TO RELATED APPLICATION

The present application claims priority under 35 U.S.C. §119 to Japanese Patent Application Nos. 2008-254761, 2008-255161, and 2008-254810, filed on Sep. 30, 2008, the entire contents of which are hereby incorporated by reference.

BACKGROUND OF THE INVENTION

1. Field of the Invention

The present invention relates to a saddle-ride electric vehicle equipped with, a head pipe steerably supporting a front fork with a front wheel journaled to a lower end portion and a steering handlebar, a main frame extending downward and rearward from the head pipe, and an electric motor generating power for rotatively driving a rear wheel.

2. Description of Background Art

A motorcycle equipped with a battery, which supplies electric power to an electric motor, under a main frame extending downward and rearward from a head pipe has been disclosed in JP-A No. 2003-182669.

However, in the motorcycle disclosed in JP-A No. 2003-182669, a motor unit having an electric motor generating power for rotatively driving the rear wheel is attached between the lower portion of a front bracket hung from a main frame and the lower portion of a pivot frame extending downward from the rear end of the main frame, and a battery is disposed in a narrow space between the motor unit and the main frame, such that it is difficult to dispose a large battery.

SUMMARY AND OBJECTS OF THE INVENTION

The present invention is designed in consideration of the above problem, and it is an object to provide a saddle-ride electric vehicle that can be equipped with a large battery while maintaining good external appearance.

According to an embodiment of the present invention, a saddle-ride electric vehicle includes a head pipe steerably supporting a front fork with a front wheel WF journaled to a lower end portion and a steering handlebar, and a main frame extending downward and rearward from the head pipe, and an electric motor generating power for rotatively driving a rear wheel. A battery supplying electric power to the electric motor is disposed in a space that is surrounded by a down frame connected to the head pipe or a front end portion of the main frame and extending downward, a pivot frame connected to a rear end portion of the main frame and extending downward, and the main frame, and the electric motor is disposed on a side of the rear wheel rather than the space.

According to an embodiment of the present invention, a front end portion of a swing arm with the rear wheel journaled to the a end portion is connected swingably up/down to the pivot frame and the electric motor is disposed, with a rotational axis arranged coaxially with the rear wheel, at a rear end portion of the swing arm.

According to an embodiment of the present invention, a plurality of cells for a battery, which is combined with each other to form the battery, is aligningly arranged in a battery box having an upper surface substantially corresponding to a lower surface of the main frame and disposed in the space that is surrounded by the main frame, the down frame, and the pivot frame, corresponding to a shape of the battery box.

According to an embodiment of the present invention, a lower frame, which is selectable between a connection state that supports the battery box by connecting the down frame with the pivot frames and a disconnection state that allows the main battery box to be drawn out downward by cutting the connection, is disposed between lower portions of the down frame and the pivot frame.

According to an embodiment of the present invention, driving circuit means that receives electric power supplied from the battery and drives the electric motor is accommodated in a side cover that is disposed under an occupant seat disposed above a seat rail, which is connected to the main frame and extends rearward, and covers the seat rail from a side.

According to an embodiment of the present invention, in addition to the configuration of the invention according to claim 1, the driving circuit means is accommodated in one side cover of the pair of left and right side covers, and charging circuit means for charging the battery is accommodated in the other side cover of both side covers.

According to an embodiment of the present invention, the driving circuit means and the charging circuit means are disposed inside in a width direction of the occupant seat, when seen from above.

According to an embodiment of the present invention, the driving circuit means and the charging circuit means are disposed in a space surrounded by the main frame, the occupant seat, and a rear frame.

According to an embodiment of the present invention, the electric motor is disposed at a position different from a space that is surrounded by a down frame connected to the head pipe or a front end portion of the main frame and extending downward, a pivot frame connected to a rear end portion of the main frame and extending downward, and the main frame, and a battery supplying electric power to the electric motor is disposed in the space such that at least a portion of an upper end of the battery overlaps the main frame when seen from a side.

According to an embodiment of the present invention, a battery box having an upper surface backward and downward along to correspond to the main frame is disposed in the space surrounded by the main frame, the down frame, and the pivot frame, and a plurality of battery cells, which is combined with each other to form the battery, is aligningly arranged in the battery box, corresponding to the shape of the battery box.

According to an embodiment of the present invention, a lower frame, which is selectable between a connection state that supports the battery box by connecting the down frames with the pivot frames and a disconnection state that allows the battery box to be drawn out downward by cutting the connection, is disposed between the lower portions of the down frame and the pivot frame.

According to an embodiment of the present invention, the down frame has an upper-down frame of which the upper end portion is connected to the head pipe or the front end portion of the main frame and a lower-down frame of which the upper end portion is connected to the lower end portion of the upper-down frame, and the lower-down frame can be selectable between a position extending downward from the upper-down frames such that the front portion of the lower frame is connected to the lower portion of the lower-down frame and a position rotating forward with the lower portion of the lower-down frame disconnected from the front portion of the lower frame, and is rotatably connected to the upper-down frame.

According to an embodiment of the present invention, at least a portion of the lower frame overlaps the lower portion of the battery box in the connection state of the lower frame when seen from a side, and the lower frame is disposed inside from both sides in a width direction of the battery box.

According to an embodiment of the present invention, a step where an occupant sitting on the occupant seat places feet is provided at the front end of a pair of left and right step-frames, which is connected to the lower portion of the pivot frame while extending forward, and overlapped by the rear portion of the battery when seen from above, is positioned at both sides of the battery when seen from above, and a bottom of the battery is formed to be stepped downward to the front portion, having a rear bottom disposed above the step-frame when seen from a side and a front bottom disposed below the step-frame between the step and the down frame.

A main battery 30 of an embodiment corresponds to the battery of the present invention, cells 31 for a main battery of an embodiment correspond to the cells for a battery of the present invention, a main battery box 32 of an embodiment corresponds to the battery box of the present invention, and a first space S1 of an embodiment corresponds to the space of the present invention.

Effects of the Invention Include the Following:

According to an embodiment of the present invention, the space surrounded by the main frame, the down frame, and the pivot frame is increased by disposing the electric motor on the side of the rear wheel rather than the space, and by disposing the battery in the increased space, it is possible to dispose a large battery.

According to an embodiment of the present invention, since the electric motor is attached, with the rotational axis arranged coaxially with the rear wheel, to the rear end portion of the swing arm, it is possible to compactly dispose the electric motor while ensuring an installation space for the battery.

According to an embodiment of the present invention, since the plurality of cells for a battery, which is combined with each other to form the battery, is aligningly arranged in the battery box, corresponding to the shape of the battery box, it is possible to accommodate more cells for a battery in the battery box.

According to an embodiment of the present invention, in the disconnection state of the lower frame, it is possible to draw out the battery box downward, such that maintenance of the battery is facilitated.

According to an embodiment of the present invention, the space surrounded by the main frame, the down frame, and the pivot frame is increased by disposing the electric motor at a position different from the space. Further, by disposing the battery in the increased space, it is possible to dispose a larger battery. In addition, by accommodating the driving circuit means in the side cover disposed under the occupant seat and covering the seat rail from a side, it is possible to improve the external appearance such that the driving circuit means is not seen from the outside.

According to an embodiment of the present invention, since the driving circuit means is accommodated in one of the left and right side covers and the charging circuit means is accommodated in the other side cover, it is possible to maintain good left-right weight balance and dispose the driving circuit means and the charging circuit means while achieving good external appearance, by effectively using the space inside both side covers.

According to an embodiment of the present invention, since the driving circuit means and the charging circuit means are disposed inside in the width direction of the occupant seat when seen from above, it is possible to dispose the driving circuit means and the charging circuit means without interfering with the feet of the occupant sitting on the occupant seat, and the driving circuit means and the charging circuit means can be protected by the occupant seat.

According to an embodiment of the present invention, it is possible to surround and protect the driving circuit means and the charging circuit means with the main frame, the occupant seat, and the rear frame.

According to an embodiment of the present invention, the space surrounded by the main frame, the down frame, and the pivot frame is increased by disposing the electric motor at a position different from the space. Further, by disposing the battery in the increased space, it is possible to dispose a large battery. In addition, since at least a portion of the upper end of the battery overlaps the main frame when seen from a side, it is possible to increase the size of the battery by extending upward the battery.

According to an embodiment of the present invention, since the plurality of battery cells, which is combined with each other to form the battery, is aligningly arranged in the battery box, corresponding to the shape of the battery box, it is possible to dispose more battery cells in the battery box.

According to an embodiment of the present invention, in the disconnection state of the lower frame, it is possible to draw out the battery box downward, such that maintenance of the battery is facilitated.

According to an embodiment of the present invention, in the disconnection state of the lower frame, by rotating forward the lower-down frame of the down frame, it is possible to draw out the battery box obliquely downward forward, such that it is possible to easily draw out the battery box.

According to an embodiment of the present invention, at least a portion of the lower frame, which is disposed inside from both sides in the width direction of the battery box, overlaps the lower portion of the battery box in the connection state of the lower frame when seen from a side, such that it is prevented that the vehicle width is increased by disposing the lower frame and the minimum height from the ground can be ensured. It is possible to compensate the amount of volume reduced by forming the recessed portions at the lower sides of the battery box to accommodate the lower frame in the connection state, by extending upward the battery such that at least a portion of the upper end of the battery overlaps the main frame when seen from a side.

According to an embodiment of the present invention, since the steps disposed at both sides of the battery when seen from above are provided at the front ends of the pair of left and right step-frames overlapped by the rear portions of the battery when seen from above, it is possible for the occupant to more comfortably place the feet without increasing the width between both step-frames. Further, since the bottom of the battery is formed to be stepped downward to the front portion, having a rear bottom positioned above the step-frames when seen from a side and a front bottom positioned below the step-frames, it is possible to prevent the size of the battery from decreasing, while preventing the width between both step-frames from increasing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
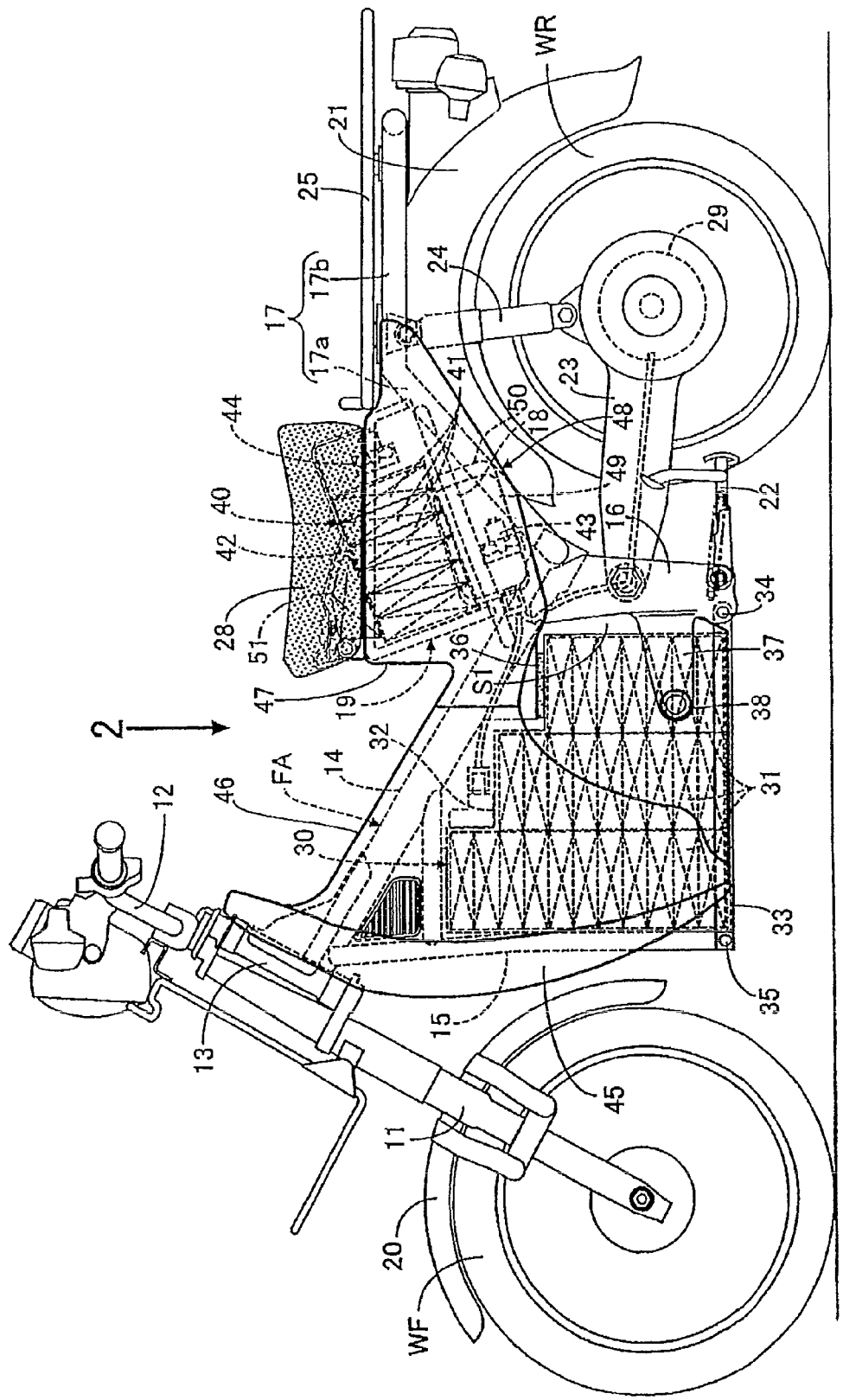
FIG. 1 is a left side view of a motorcycle according to an embodiment.

First, in FIGS. 1 to 4, a vehicle body frame FA of a motorcycle, which is a saddle-ride electric vehicle, includes a head pipe 13 steerably supporting a front fork 11 with a front wheel WF journaled to a lower end portion and a bar-shaped steering handlebar 12 connected to the upper portion of the front fork 11, a pipe-shaped main frame 14 extending downward and rearward from the head pipe 13, a pivot frame 16 connected to the rear end portion of the main frame 14 and extending downward, a pair of left and right rear frames 17 connected to the rear end portion of the main frame 14 and extending rearward, and a pair of left and right seat rails 18 disposed between the rear portion of the main frame 14 and the middle portions of both rear frames 17 and inclined upward and rearward.

The rear frames 17 each have inclined portions 17a extending upward and rearward from the rear end portion of the main frame 14 and horizontal portions 17b extending horizontally rearward from the rear ends of the inclined portions 17a, which are integrally formed, and the rear portions of the horizontal portions 17b are connected to each other. Further, the rear ends of the seat rails 18 are connected to the rear upper portions of the inclined portions 17a of the rear frames 17.

A front fender 20 that covers the front wheel WF from above is attached to the front fork 11 and a rear fender 21 that covers the rear wheel WR from above is attached to the rear frames 17. Further, a main stand 22 is rotatably attached to the lower portion of the pivot frame 16. In addition, the front end portion of a swing arm 23 with the rear wheel WR journaled to the rear end portion is connected swingably up/down to the pivot frame 16 and rear cushion units 24 are disposed between the front portions of the horizontal portions 17b of the rear frames 17 and the rear portion of the swing arm 23. Furthermore, a load-carrying platform 25 is disposed on the horizontal portions 17b of the rear frames 17.

Figure 5:
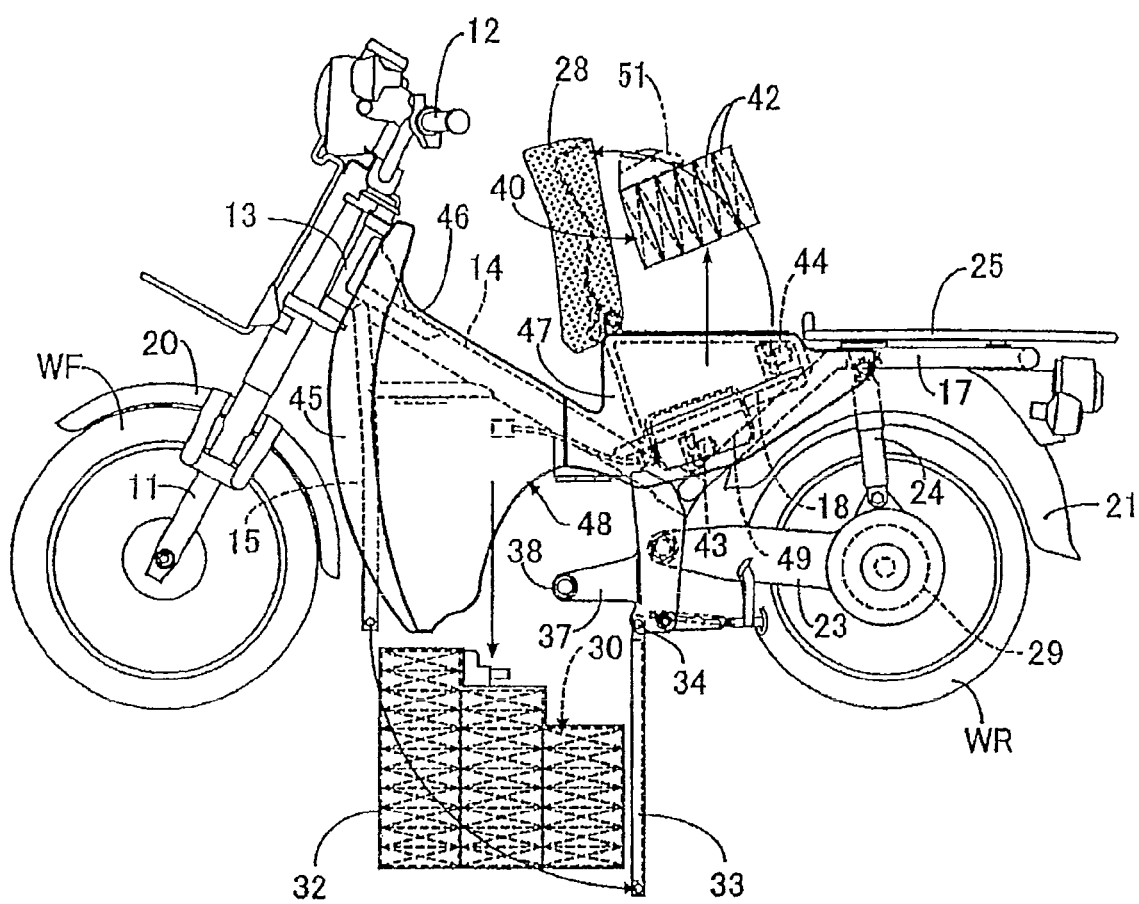
FIG. 5 is a view illustrating the attachment and detachment of a battery.

An occupant seat 28 is disposed ahead of the load-carrying platform 25 and supported to the seat rails 18 through a seat support frame 19, such that, as shown in FIG. 5, the occupant seat 28 is supported rotatably forward by the seat support frame 19. Thus, the seat support frame 19 has a horizontal seat support portion 19a supporting the occupant seat 28, a front leg 19b extending downward from the front portion of the seat support portion 19a, and a rear leg 19c extending downward from the rear portion of the seat support portion 19a, in which the lower end of the front leg 19b is fixed to the front portions of the seat rails 18 and the lower end of the rear leg 19c is fixed to the rear portion of the inclined portions 17a of the rear frames 17.

On the other hand, the rear wheel WR is rotatively driven by the power generated by the electric motor 29 and a main battery 30 supplying electric power to the electric motor 29 is disposed in a first space S1 (see FIGS. 1 and 3) which is surrounded by the main frame 14, a down frame 15 that forms a portion of the vehicle body frame FA and is connected to the head pipe 13 or the front end portion of the main frame 14 (the front end portion of the main frame 14 in this embodiment) while extending downward, and the pivot frame 16. On the other hand, the electric motor 29 is disposed at a position different from the first space S1, and in this embodiment, the electric motor 29 is disposed, with the rotational axis arranged coaxially with the rear wheel WR, at the rear end portion of the swing arm 23 behind the first space S1.

The main battery 30 is composed of a plurality of cells 31 for a main battery, which is combined with each other, and each of the cells 31 for a main battery has an upper surface substantially corresponding to the main frame 14 of the vehicle body frame FA and the cells are aligningly arranged in a main battery box 32 disposed in the first space S1 surrounded by the main frame 14, the down frame 15, and the pivot frame 16, corresponding to the shape of the main battery box 32.

Thus, the upper surface of the main battery box 32 is formed to correspond to the lower surface of the main frame 14 extending downward and rearward, and in this embodiment, is formed to be gradually lowered to the rear.

In addition, a lower frame 33, which is selectable between a connection state that supports the main battery box 32 by connecting the down frame 15 with the pivot frame 16 and a disconnection state that allows the main battery box 32 to be drawn out downward by cutting the connection, is disposed between the lower portions of the down frame 15 and the pivot frame 16. In this embodiment, the rear portion of the lower frame 33 is swingably connected to the lower portion of the pivot frame 16 through a spindle 34 and the front portion of the lower frame 33 is detachably connected to the lower portion of the down frame 15 by a detachable connecting pin 35 or the like. That is, the lower frame 33 which is selectable between the connection state where the front portion of the lower frame is connected to the down frame 15 and the disconnection state where the front portion of the front frame is separated from the down frame 15, such that it is possible to draw out downward the main battery box 32 by rotating down the front portion of the lower frame 33 in the disconnection state, as shown in FIG. 5.

Further, elastic members 36 are interposed between the upper surface of the main battery box 32 supported by the lower frame 33, which is in the connection state, and the vehicle body frame FA.

Further, a pair of left and right step-frames 37 that extends forward from the pivot frame 16 is connected to the lower portion of the pivot frame 16, and steps 38 where an occupant sitting on the occupant seat 28 puts the feet are provided at the front ends of the step-frames 37.

Figure 2:
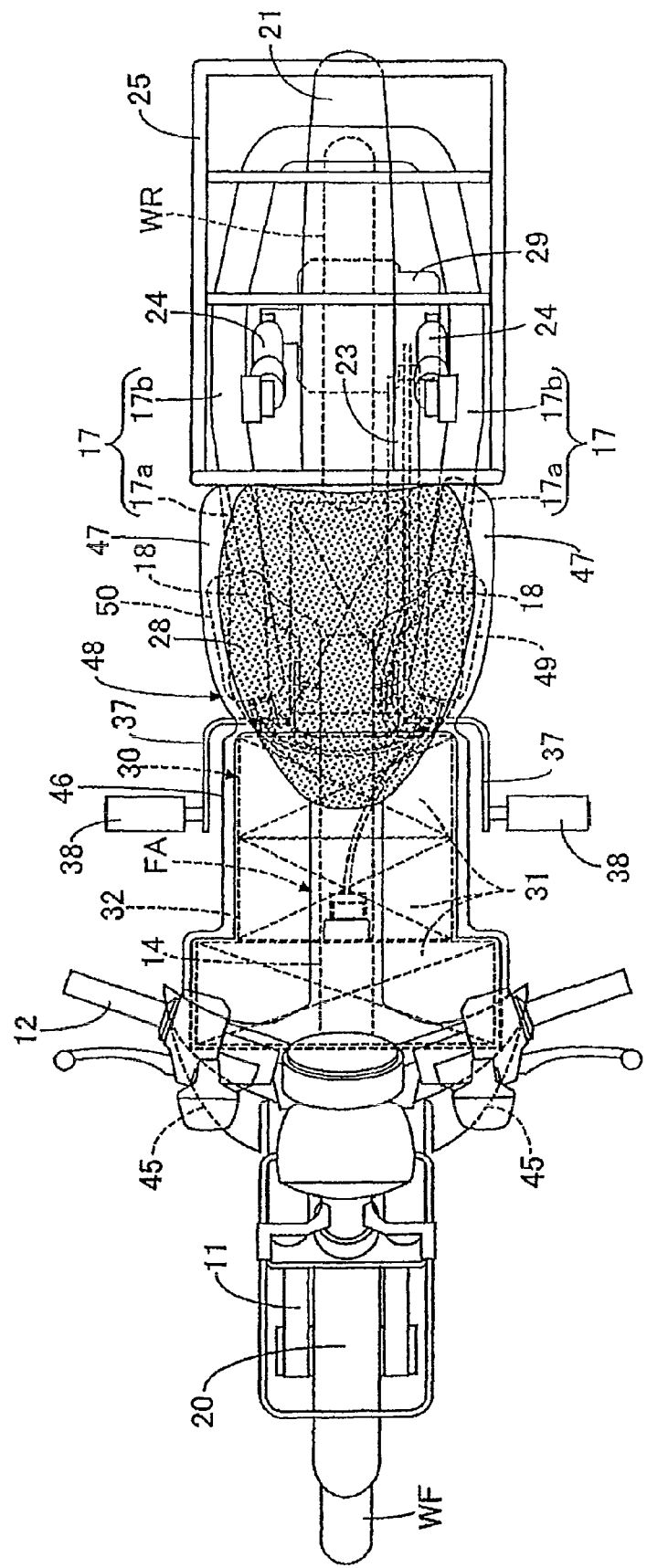
FIG. 2 is a view seen from the direction of an arrow indicated by reference numeral 2 in FIG. 1.
Figure 3:
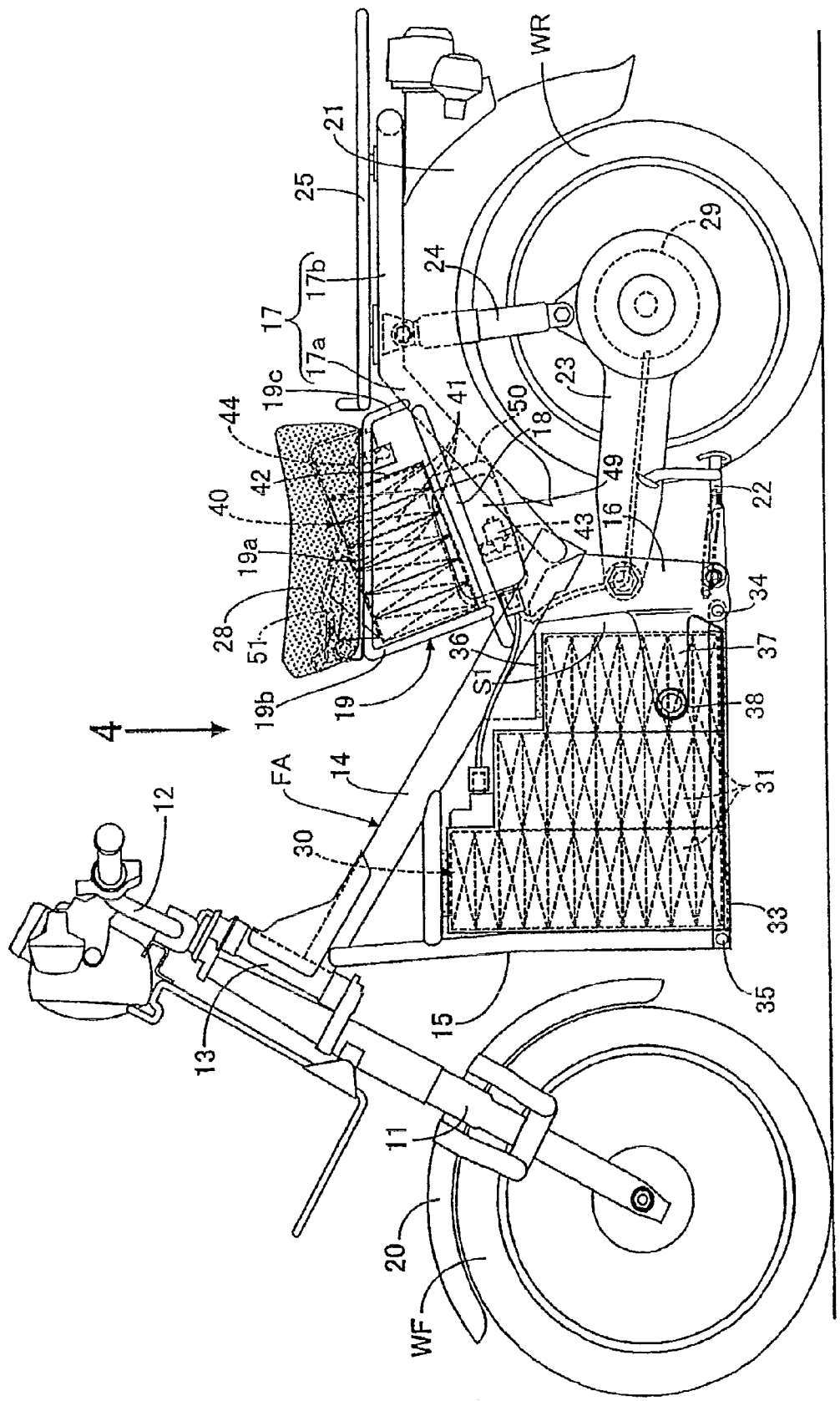
FIG. 3 is a left side view of the motorcycle with a vehicle body cover removed.
Figure 4:
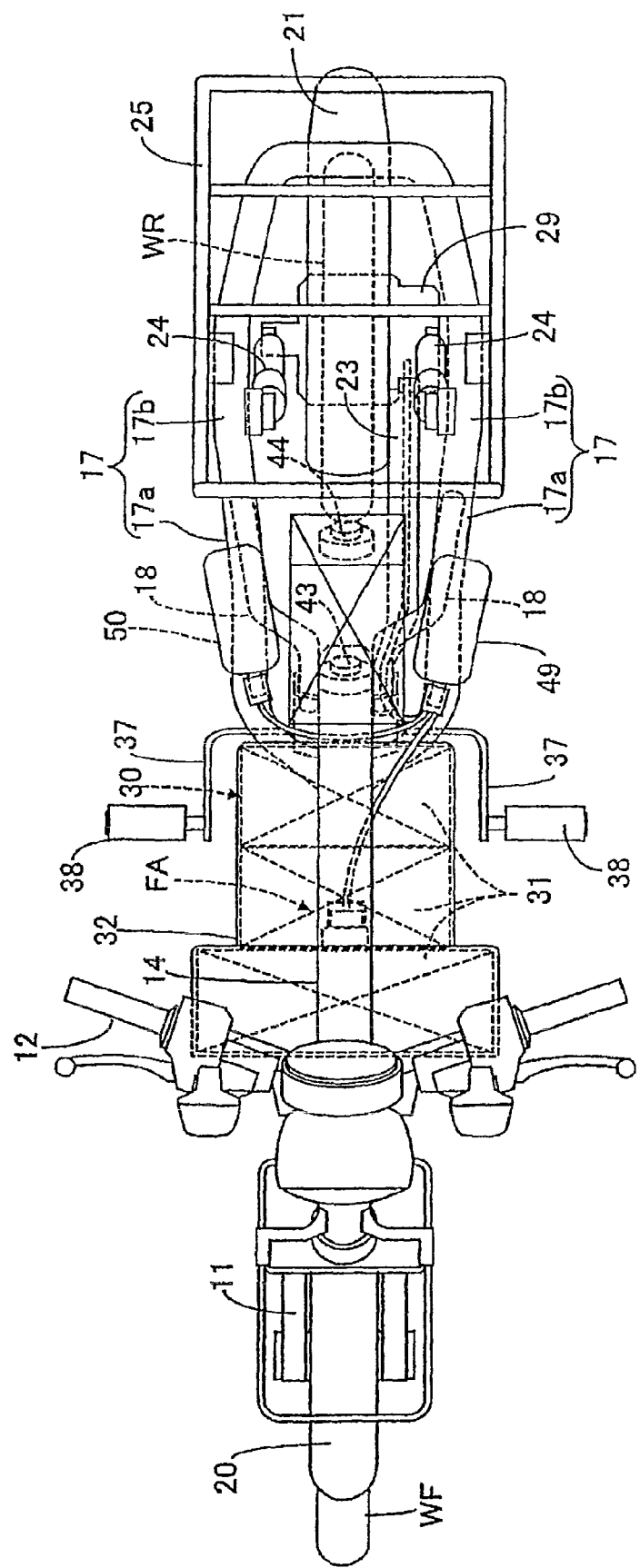
FIG. 4 is a view seen from the direction of an arrow indicated by reference numeral 5 in FIG. 3.

Thus, the main battery box 32 accommodating the main battery 30 does not overlap the step-frames 37 and steps 38 in a plane view, as shown in FIGS. 2 and 4, and in this embodiment, the rear width of the main battery box 32, that is, the main battery 30 is set to be narrower than the width of front portion of the main battery box 32, corresponding to the step-frames 37 and the steps 38 disposed at both rear sides of the main battery box 32. In addition, in order to increase the capacity of the main battery 30, the main battery box 32 is formed to extend rearward such that the rear end portion overlaps the step-frames 37 in a side view.

Further, a sub-battery 40 that can supply electric power to the electric motor 29, instead of the main battery 30, is disposed in a second space S2 surrounded by the main frame 14 and the seat rails 18 and positioned under the occupant seat 28 such that it can be drawn out of the second space S2 with the occupant seat 28 rotated forward, as shown in FIG. 5, and the sub-battery 40 is surrounded by the seat support frame 19. Thus, the electric motor 29, unlike the first space S1, is disposed behind the first space S1 and positioned at the rear end portion of the swing arm 23, such that it is disposed at a different position from the second space S2.

The sub-battery 40 is composed of a plurality of cells 41 for a sub-battery, which is combined with each other, and the cells 41 for a sub-battery are formed to correspond to the second space S2 and aligningly arranged in a sub-battery box 42 disposed in the second space S2, corresponding to the shape of the sub-battery box 42.

A first cooling fan 43 that sucks air heated by the main battery 30 to the rear side of the first space S1 and discharges the air rearward of the occupant seat 28 is supported by the seat rails 18 of the vehicle body frame FA, and the main battery box 32 disposed in the first space S1 is formed such that traveling air coming from the front area of the motorcycle can be introduced from the front and discharged through the rear upper portion.

Further, a second cooling fan 44 that sucks air heated by the sub-battery box 42 disposed in the second space S2 from the second space S2 and discharges the air rearward of the occupant seat 28 is supported by the rear leg 19c of the seat support frame 19 of the vehicle body frame FA.

Meanwhile, both legs of the occupant sitting on the occupant seat 28 are covered by leg shields 45 from the front, and the leg shields 45 are integrally formed with a synthetic resin center cover 46 to cover the front portion of the main battery box 32 from both sides while covering the main frame 14 from above. On the other hand, the seat rails 18, the seat support frame 19, the sub-battery box 42, and the second cooling fan 44 are covered by a pair of left and right synthetic resin side covers 47 disposed under the occupant seat 28, from both sides, and the synthetic resin side covers 47 are connected to the center cover 46 and form a vehicle body cover 48 together with the center cover 46.

In addition, driving circuit means 49 that receives electric power supplied from the main battery 30 and the sub-battery 40 to drive the electric motor 29 is accommodated in one of the side covers 47 and charging circuit means 50 for charging the main battery 30 is accommodated in the other one of the side covers 47. Further, a charging cord 51 is accommodated between the occupant seat 28 and the sub-battery box 42.

Further, the driving circuit means 49 and the charging circuit means 50 are disposed inside in the width direction of the occupant seat 28 when seen from above, and disposed in the space surrounded by the main frame 14, the occupant seat 28, and the rear frames 17.

The operation of this embodiment will be described hereafter. Since the main battery 30 supplying electric power to the electric motor 29 generating power for rotatively driving the rear wheel WR is disposed in the first space S1 surrounded by the down frame 15 connected to the front end portion of the main frame 14 and extending downward, the pivot frame 16 connected to the rear end portion of the main frame 14 and extending downward, and the main frame 14, and the electric motor 29 is disposed at a position different from the first space S1, it is possible to dispose the large main battery 30 by increasing the first space S1 to dispose the main battery 30 in the increased first space S1.

Further, since the front end portion of the swing arm 23 with the rear wheel WR journaled to the rear end portion is connected swingably up/down to the pivot arm 16 and the electric motor 29 is disposed with the rotational axis arranged coaxially with the rear wheel WR at the rear end portion of the swing arm 23, it is possible to compactly dispose the electric motor 29 while ensuring an installation space for the main battery 30.

Further, since the lower frame 33, which is selectable between a connection state that supports the main battery box 32 by connecting the down frame 15 with the pivot frame 16 and a disconnection state that allows the main battery box 32 to be drawn out downward by cutting the connection, is disposed between the lower portions of the down frame 15 and the pivot frame 16, in the disconnection state of the lower frame 33, it is possible to draw out the main battery box 32 downward and maintenance of the main battery 30 is facilitated.

Further, the main battery 30 is disposed in the first space S1, whereas the sub-battery 40 that can supply electric power to the electric motor 29 instead of the main battery 30 is disposed in the second space S2, which is surrounded by the rear frames 17 connected to the rear end portion of the main frame 14 and extending upward and rearward, the seat rails 18 supporting the occupant seat 28 while connecting the rear portion of the main frame 14 with the middle portions of the rear frames 17, and the main frame 14, and the electric motor 29 is disposed at a position different from the second space S2. Accordingly, by disposing the main battery 30 and the sub-battery 40 in the first and second spaces S1, S2, which can be formed larger by not disposing the electric motor 29, it is possible to dispose a larger main battery 30 and sub-battery 40 and supply electric power to the electric motor 29 from the sub-battery 40 instead of the main battery 30, when the main battery 30 is discharged.

The main battery 30 is composed of the plurality of cells 31 for a main battery, which is combined with each other, the cells 31 for a main battery have upper surfaces substantially corresponding to the lower surface of the main frame 14 and are arranged in a main battery box 32 disposed in the first space S1 surrounded by the main frame 14, the down frame 15, and the pivot frame 16, corresponding to the shape of the main battery box 32, the sub-battery 40 is composed of the plurality of cells 41 for a sub-battery, which is combined with each other, and the cells 41 for a sub-battery are formed to correspond to the second space S2 and aligningly arranged in a sub-battery box 42 disposed in the second space S2, corresponding to the shape of the sub-battery box 42. Accordingly, it is possible to accommodate more cells 31 for a main battery in the main battery box 32 and accommodate more cells 41 for a sub-battery in the sub-battery box 42.

Further, the side covers 47 covering the seat rails 18 from the sides are disposed under the occupant seat 28 disposed above the seat rails 18 and the driving circuit means 49 receiving electric power supplied from the main battery 30 or the sub-battery 40 and driving the electric motor 29 is accommodated in the side cover 47. Accordingly, the driving circuit means 49 is not seen from the outside and the external appearance can be improved.

In addition, the pair of left and right side covers 47 is disposed at both the left and right sides of the seat rails 18, the driving circuit means 49 is accommodated in one of the side covers 47, and the charging circuit means 50 for charging the main battery 30 is accommodated in the other one of both side covers 47. Accordingly, it is possible to dispose the driving circuit means 49 and the charging circuit means 50 while maintaining good left-right weight balance, effectively using the space inside both side covers 47, and achieving good external appearance.

Further, the first cooling fan 43 that sucks air heated by the main battery 30 to the rear side of the first space S1 and discharges the air rearward of the occupant seat 28 is supported by the seat rails 18 of the vehicle body frame FA and the main battery box 32 disposed in the first space S1 is formed such that traveling air coming from the front area of the motorcycle can be introduced from the front and discharged from the rear upper portion. Accordingly, the heat generated by the main battery 30 can be discharged rearward of the occupant seat 28.

Further, since the driving circuit means 49 and the charging circuit means 50 are disposed inside in the width direction of the occupant seat 28 when seen from above, it is possible to dispose the driving circuit means 49 and the charging circuit means 50 without interfering with the feet of the occupant striding across the occupant seat 28, and the driving circuit means 49 and the charging circuit means 50 can be protected by the occupant seat 28. Since the driving circuit means 49 and the charging circuit means 50 are disposed in the space surrounded by the main frame 14, the occupant seat 28, and the rear frames 17, it is possible to protect the driving circuit means 49 and the charging circuit means 50 by surrounding them with the main frame 14, the occupant seat 28, and the rear frames 17.

In addition, since the main battery box 32 is formed such that traveling air coming from the front area of the motorcycle can be introduced from the front and discharged from the rear upper portion and the main battery 30 is accommodated in the main battery box 32, it is possible to effectively discharge the air in the main battery box 32 and effectively cool the main battery 30 in the main battery box 32 by operating the first cooling fan 43.

Further, the sub-battery 40 that can supply electric power to the electric motor 29 instead of the main battery is disposed in the second space S2 surrounded by the rear frames 17, the seat rails 18, and the main frame 14, and the second cooling fan 44 that sucks air heated by the sub-battery box 40 from the second space S2 and discharges the air rearward of the occupant seat 28 is supported by the rear leg 19c of the seat support frame 19 of the vehicle body frame FA. Accordingly, it is possible to discharge the heat generated by the sub-battery 40 rearward of the occupant seat 28.

Further, since the main battery 30 and the main battery box 32 are disposed in the first space S1 without overlapping both step-frames 37 and the steps 38 disposed at the front ends of both step-frames 37 in a plain view, it is possible for the occupant to more comfortably put the feet without increasing the width between both step-frames 37. Furthermore, by disposing both step-frames 37 and both steps 38, although the width of the main battery 30 has to be decreased where the occupant strides across the occupant seat 28, the width of the main battery 30 is increased at the portion positioned further forward from both step-frames 37 and both steps 38. Accordingly, it is possible for the occupant to more comfortably put the feet, to considerably increase the capacity of the main battery box 32, and to increase the size of the main battery 30 by accommodating more cells 31 for a main battery in the main battery box 32.

Figure 6:
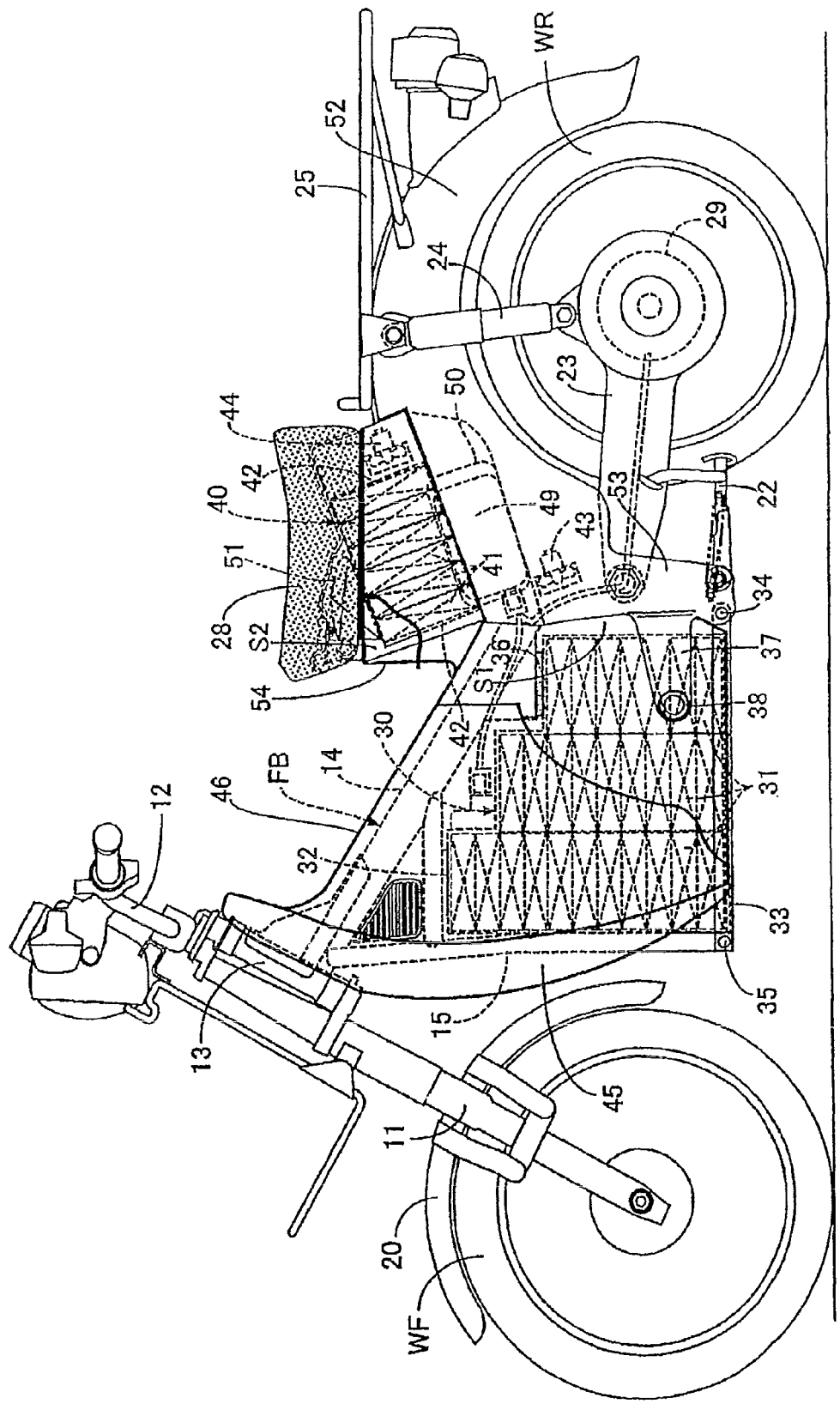
FIG. 6 is a left side view of a motorcycle according to another embodiment.

FIG. 6 shows another embodiment of the present invention, in which parts corresponding to those in the embodiment FIGS. 1-5 are designated by the same reference numerals and detailed description is not provided.

A vehicle body frame FB of a motorcycle includes a head pipe 13 steerably supporting a front fork 11 with a front wheel WF journaled to a lower end portion and a steering handlebar 12, a pipe-shaped main frame 14 extending downward and rearward from the head pipe 13, and a rear frame 52 that is separable to the left and right and is connected to the lower portion of the main frame 13. The rear frame 52 integrally has a pivot frame 53 connected to the rear end of the main frame 14 and extending downward and has functions of a seat rail supporting an occupant seat 28 and a rear fender covering the rear wheel WR from above.

A pair of left and right step-frames 37 that extends forward from the pivot frame 53 is connected to the lower portion of the pivot frame 53 and steps 38 where an occupant sitting on the occupant seat 28 puts the feet are provided at the front ends of the step-frames 37.

The rear wheel WR is journaled to the rear portion of a swing arm 23 swingably supported by the lower portion of the pivot frame 53 and an electric motor 29 generating power for rotatively driving the rear wheel WR is disposed with the rotational axis thereof arranged coaxially with the rear wheel WR.

A main battery 30 supplying electric power to the electric motor 29 is composed of a plurality of cells 31 for a main battery, which is combined with each other, and accommodated in a main battery box 32, and the main battery box 32 is disposed in a first space S1 surrounded by a main frame 14, a down fame 15 connected to the head pipe 13 or the front end portion of the main frame 14 (the front end portion of the main frame 14 in this embodiment) and extending downward, and the pivot frame 53, without overlapping the step-frames 37 and the steps 38 in a plane view, in which the upper surface of the main battery box 32 corresponds to the lower surface of the main frame 14 extending downward and rearward, and is formed to be gradually lowered to the rear.

In addition, a lower frame 33, which is selectable between a connection state that supports the main battery box 32 by connecting the down frame 15 with the pivot frame 53 and a disconnection state that allows the main battery box 32 to be drawn out downward by cutting the connection, is disposed between the lower portions of the down frame 15 and the pivot frame 53. Therefore, since the lower frame 33 which is selectable between the connection state where the front portion is connected to the down frame 15 and the disconnection state where the front portion is separated from the down frame 15, it is possible to draw out downward the main battery box 32 by rotating down the front portion of the lower frame 33 in the disconnection state.

Further, a sub-battery 40 that can supply electric power to the electric motor 29, instead of the main battery 30, is disposed in a second space S2 surrounded by the main frame 14 and the rear frame 52 functioning as the seat rails, under the occupant seat 28. The sub-battery 40 is composed of a plurality of cells 41 for a sub-battery, which is combined with each other, and the cells 41 for a sub-battery are formed to correspond to the second space S2 and aligningly arranged in a sub-battery box 42 disposed in the second space S2, corresponding to the shape of the sub-battery box 42.

A first cooling fan 43 that sucks air heated by the main battery 30 to the rear side of the first space S1 and discharges the air rearward of the occupant seat 28 is supported by the rear frame 52 of the vehicle body frame FB, and the main battery box 32 disposed in the first space S1 is formed such that traveling air coming from the front area of the motorcycle can be introduced from the front and discharged from the rear upper portion.

Further, a second cooling fan 44 that sucks air heated by the sub-battery 40 disposed in the second space S2 and discharges the air rearward of the occupant seat 28 is supported by the rear frame 52 of the vehicle body frame FB.

By the way, both left and right legs of the occupant sitting on the occupant seat 28 are covered by leg shields 45 from the front, and the leg shields 45 are integrally formed with a synthetic resin center cover 46 to cover the front portion of the main battery box 32 from both sides while covering the main frame 14 from above. On the other hand, the sub-battery box 42 and the second cooling fan 44 are covered by a pair of left and right synthetic resin side covers 54 disposed under the occupant seat 28, from both sides, and the synthetic resin side covers 54 are connected to the center cover 46 and the rear frame 52.

In addition, driving circuit means 49 that receives electric power supplied from the main battery 30 and the sub-battery 40 and drives the electric motor 29 and charging circuit means 50 for charging the main battery 30 are accommodated inside the rear frame 52.

Figure 7:
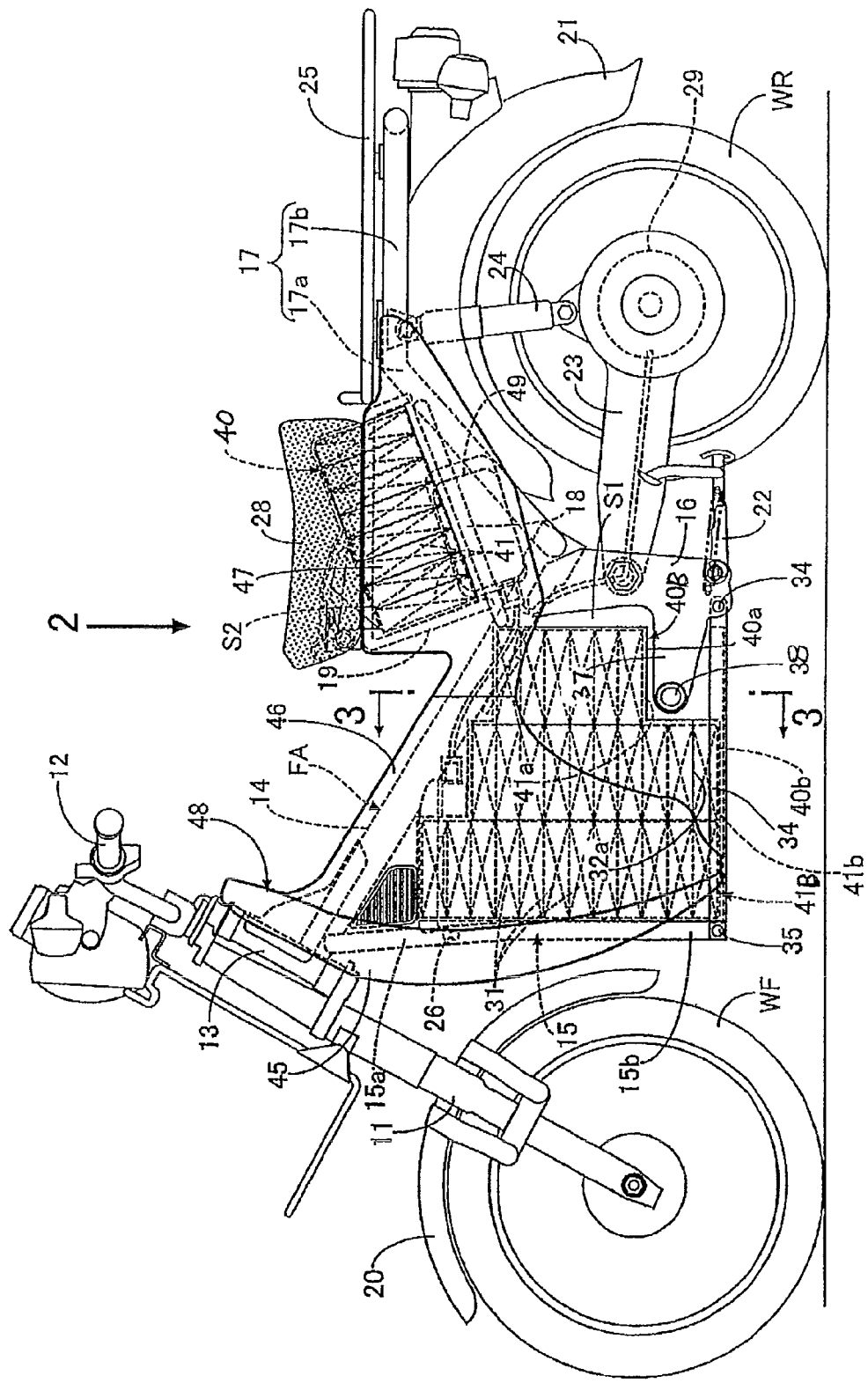
FIG. 7 is a left side view of a motorcycle according to another embodiment.
Figure 8:
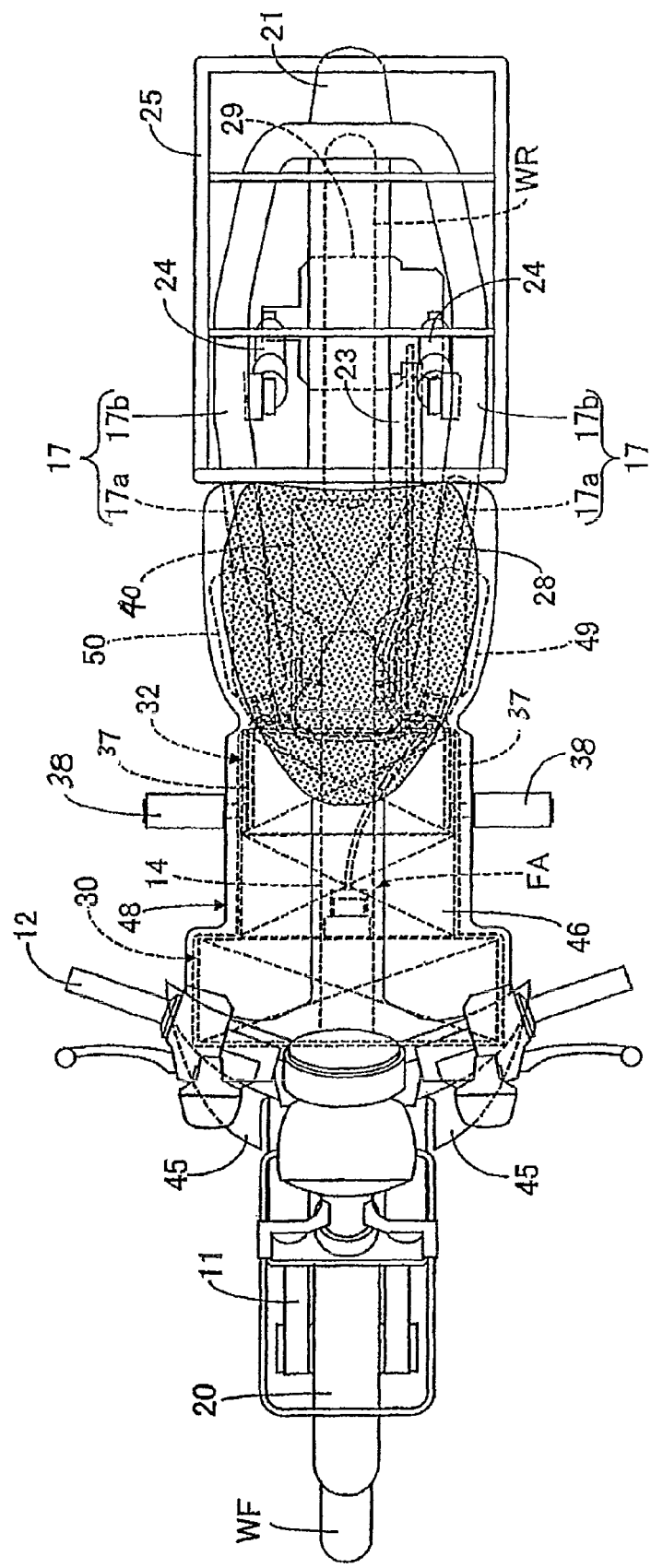
FIG. 8 is a view seen from the direction of an arrow indicated by reference numeral 2 in FIG. 7.
Figure 9:
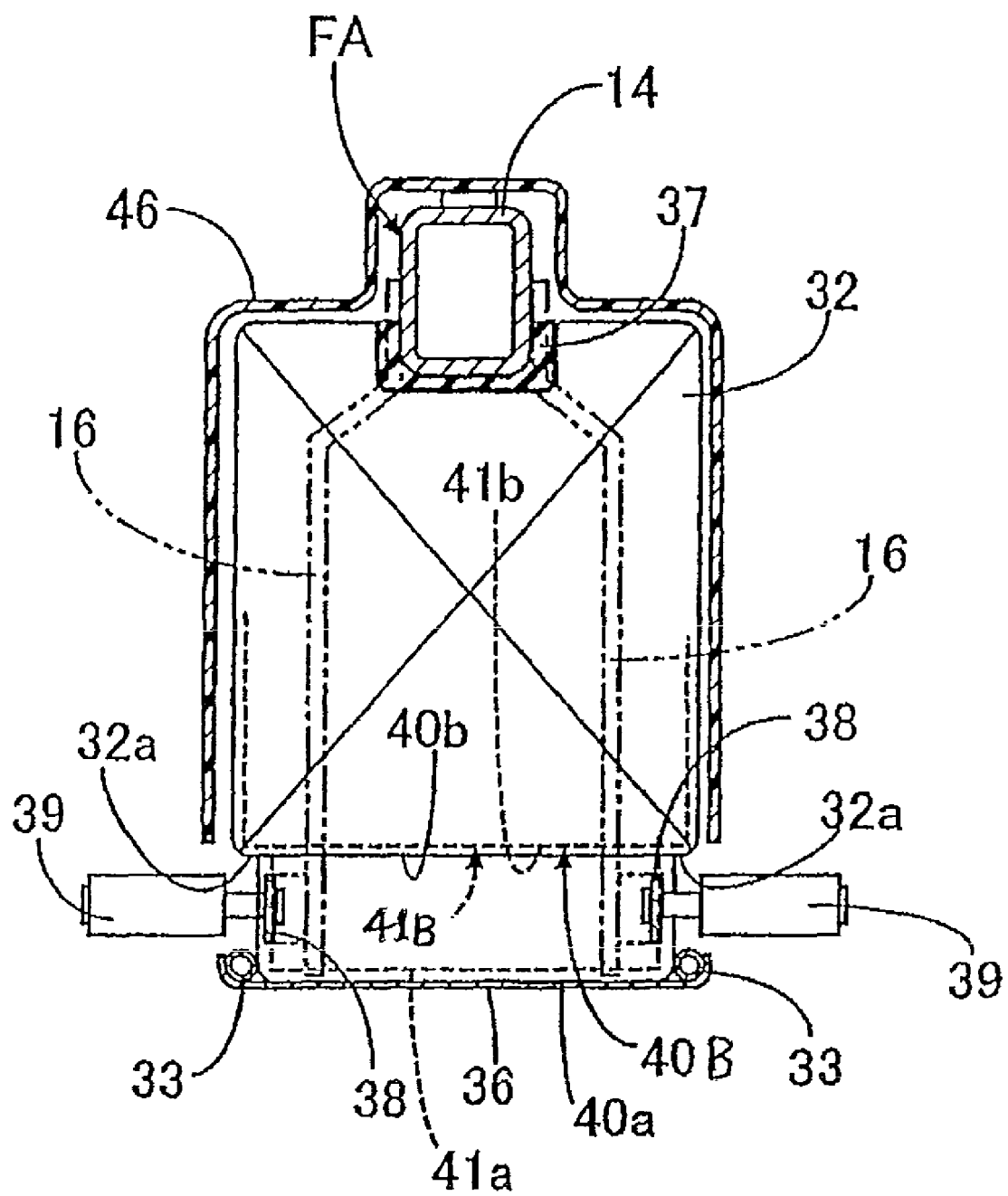
FIG. 9 is a sectional view along line 3-3 in FIG. 7.
Figure 10:
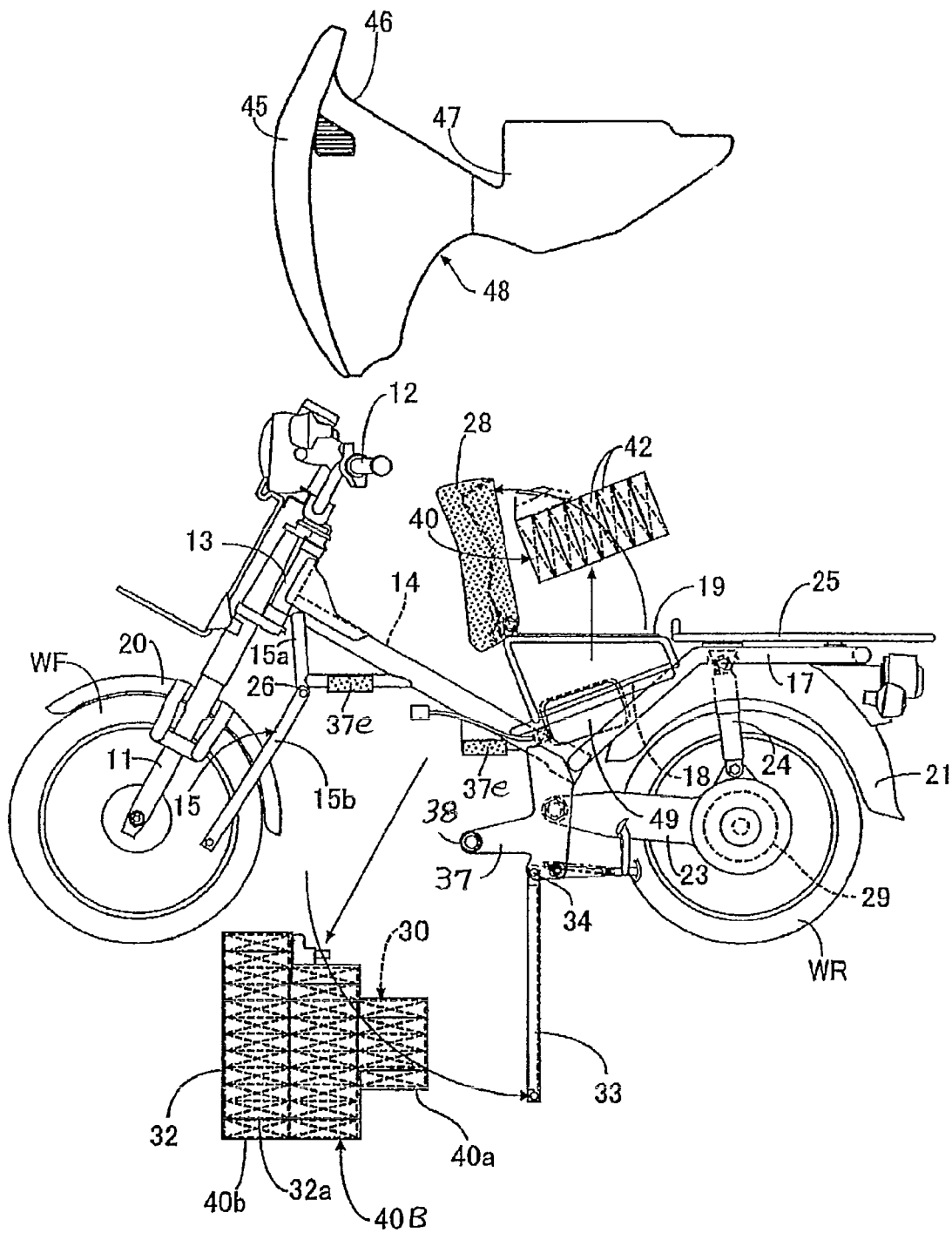
FIG. 10 is a view illustrating the attachment and detachment of a battery.

FIGS. 7-10 show another embodiment of the present invention, in which FIG. 7 is a left side view of a motorcycle, FIG. 8 is a view seen from the direction of an arrow indicated by reference numeral 2 in FIG. 7, FIG. 9 is a cross-sectional view taken along the line 3-3 of FIG. 7, and FIG. 10 is a view illustrating the attachment and detachment of a battery.

Parts illustrated in FIGS. 7-10 corresponding to those in the embodiment illustrated in FIGS. 1-5 are designated by the same reference numerals and detailed description is not provided.

In addition, a pair of left and right lower frames 33, which is selectable between a connection state that supports the main battery box 32 by connecting the down frame 15 with the pivot frame 16 and a disconnection state that allows the main battery box 32 to be drawn out downward by cutting the connection, is disposed between the lower portions of the down frame 15 and the pivot frames 16. In this embodiment, the rear portions of the lower frames 33 are swingably connected to the lower portions of the pivot frames 16 through a spindle 34 and the front portions of the lower frames 33 are detachably connected to the lower portions of the down frames 15 by detachable connecting pins 35, etc. That is, the lower frames 33 can be selectable between the connection state where the front portions are connected to the down frames 15 and the disconnection state where the front portions are separated from the down frames 15.

Thus, both lower frames 33 are connected by a supporting plate 36 on which the main battery box 32 is mounted, and in the disconnection state of both lower frames 33, as shown in FIG. 4, the lower frames 33 can be rotated such that the front portions move down.

In addition, the down frames 15 are composed of upper-down frames 15*a* of which the upper end portions are connected to the front end portion of the main frame 14 and lower-down frames 15*b* of which the upper end portions are connected to the lower end portions of the upper-down frames 15*a*. The lower-down frames 15*b* can be selectable between a position extending downward from the upper-down frames 15*a* such that the front ends of the lower frames 33 are connected to the lower portions of the lower-down frames 15*b* by connecting pins 35 and a position rotating forward with the lower portions of the lower-down frames 15*b* disconnected from the front ends of the lower frames 33, and are rotatably connected to the lower end portions of the upper-down frames 15*a* through pins 26.

Therefore, in the disconnection state of the lower frames 33, by rotating forward the lower-down frames 15*b* of the down frames 15 as shown in FIG. 10, the battery box 32 can be drawn out obliquely downward forward.

Further, at least portions of the lower frames 33, in this embodiment, the front portions of the lower frames 33, which are in the connection state, overlap the lower portion of the battery box 32 when seen from a side, and are disposed inside from the both sides in the width direction of the battery box 32. Recessed portions 32*a* that receive the front portions of the lower frames 33 in the connection state are formed at both lower sides of the front portions of the battery box 32.

Further, at least portions of the upper ends of the main battery box 32 supported by the lower frames 33 that are in the connection state and the supporting plate 36 and the battery 30, extend upward at both sides of the main frame 14 while overlapping the main frame 14 when seen from the sides, and elastic members 37*e* are interposed between the upper end portion of the main battery box 32 and the main frame 14.

Further, a pair of left and right step-frames 37 that extends forward from the pivot frames 16 is connected to the lower portions of the pivot frames 16, and steps 38 where an occupant sitting on the occupant seat 28 places the feet are provided at the front ends of the step-frames 37. In addition, both step-frames 37 are positioned to be overlapped by the rear portions of the main battery 30 and the main battery box 32 when seen from above, and the steps 38 are disposed at both sides of the main battery 30 and the main battery box 32 when seen from above.

Further, the bottom 40B of the main battery box 32 is formed to be stepped downward to the front portion, having a rear bottom 40*a* positioned above the step-frames 37 when seen from a side and a front bottom 40*b* positioned below the step-frames 37 between the steps 38 and the down frames 15. The bottom 41 of the main battery 30 accommodated in the main battery box 32 is also formed to be stepped downward to the front portion, having a rear bottom 41*a* positioned above the step-frames 37 when seen from a side and a front bottom 41*b* positioned below the step-frames 37 between the steps 38 and the down frames 15, corresponding to the shape of the main battery box 32.

The width of the rear portion of the main battery box 32 accommodating the main battery 30 is set to be narrower than the width of the front portion of the main battery box 32.

Further, in a second space S2 surrounded by the main frame 14 and the seat rails 18 under the occupant seat 28, a sub-battery 40, which can supply electric power to the electric motor 29 instead of the main battery 30, is disposed to be removed from the second space S2, with the occupant seat 28 rotated forward. The sub-battery 40 is surrounded by the seat support frame 19.

Meanwhile, both left and right legs of the occupant sitting on the occupant seat 28 are covered by leg shields 45 from the front, and the leg shields 45 are integrally formed with a synthetic resin center cover 46 to cover the front portion of the main battery box 32 from both sides while covering the main frame 14 from above. On the other hand, the seat rails 18, the seat support frame 19, and the sub-battery 40 are covered by a pair of left and right synthetic resin side covers 47 disposed under the occupant seat 28, from both sides, and the synthetic resin side covers 47 are connected to the center cover 46 and form a vehicle body cover 48 together with the center cover 46.

In addition, driving circuit means 49 that receives electric power supplied from the main battery 30 and the sub-battery 40 and drives the electric motor 29 is accommodated in one of the side covers 47 and charging circuit means 50 for charging the main battery 30 is accommodated in the other one of the side covers 47.

The operation of the embodiment will be described hereafter. Since the main battery 30 supplying electric power to the electric motor 29 generating power for rotatively driving the rear wheel WR is disposed in the first space S1 surrounded by the down frame 15 connected to the front end portion of the main frame 14 and extending downward, the pivot frame 16 connected to the rear end portion of the main frame 14 and extending downward, and the main frame 14, and the electric motor 29 is disposed at a position different from the first space S1, it is possible to dispose the large main battery 30 by increasing the first space S1 to dispose the main battery 30 in the increased first space S1.

Further, since at least a portion of the upper end of the main battery 30 overlaps the main frame 14 when seen from a side, it is possible to increase the size by extending upward the main battery 30.

Further, since the front end portion of the swing arm 23 with the rear wheel WR journaled to the rear end portion is connected swingably up/down to the pivot arm 16 and the electric motor 29 is disposed with the rotational axis arranged coaxially with the rear wheel WR at the rear end portion of the swing arm 23, it is possible to compactly dispose the electric motor 29 while ensuring an installation space for the main battery 30.

Further, the main battery 30 is disposed in the first space S1, whereas the sub-battery 40 that can supply electric power to the electric motor 29 instead of the main battery 30 is disposed in the second space S2, which is surrounded by the rear frames 17 connected to the rear end portion of the main frame 14 and extending upward and rearward, the seat rails 18 supporting the occupant seat 28 while connecting the rear portion of the main frame 14 with the middle portions of the rear frames 17, and the main frame 14, and the electric motor 29 is not disposed in the second space S2. Accordingly, by disposing the main battery 30 and the sub-battery 40 in the first and second spaces S1, S2, which can be formed larger by not disposing the electric motor 29, it is possible to dispose a larger main battery 30 and sub-battery 40 and supply electric power to the electric motor 29 from the sub-battery 40 instead of the main battery 30, when the main battery 30 is discharged.

The main battery 30 is composed of the plurality of cells 31 for a main battery, which is combined with each other, the cells 31 for a main battery have upper surfaces substantially corresponding to the lower surface of the main frame 14 and are aligningly arranged in a main battery box 32 disposed in the first space S1 surrounded by the main frame 14, the down frames 15, and the pivot frames 16, corresponding to the shape of the main battery box 32. Accordingly, it is possible to accommodate more cells 31 for a main battery in the main battery box 32.

Further, the side covers 47 covering the seat rails 18 from the sides are disposed under the occupant seat 28 disposed above the seat rails 18 and the driving circuit means 49 receiving electric power supplied from the main battery 30 or the sub-battery 40 and driving the electric motor 29 is accommodated in the side cover 47. Accordingly, the driving circuit means 49 is not seen from the outside and the external appearance can be improved.

In addition, the pair of left and right side covers 47 is disposed at both the left and right sides of the seat rails 18, the driving circuit means 49 is accommodated in one of the side covers 47, and the charging circuit means 50 for charging the main battery 30 is accommodated in the other one of both side covers 47. Accordingly, it is possible to dispose the driving circuit means 49 and the charging circuit means 50 while maintaining good left-right weight balance, effectively using the space inside both side covers 47, and achieving good external appearance.

Further, since the lower frame 33, which is selectable between a connection state that supports the main battery box 32 by connecting the down frame 15 with the pivot frame 16 and a disconnection state that allows the main battery box 32 to be drawn out downward by cutting the connection, is disposed between the lower portions of the down frame 15 and the pivot frame 16, in the disconnection state of the lower frame 33, it is possible to draw out the main battery box 32 downward and maintenance of the main battery 30 is facilitated.

In addition, the down frames 15 are composed of the upper-down frames 15a of which the upper end portions are connected to the front end portion of the main frame 14 and the lower-down frames 15b of which the upper end portions are connected to the lower end portions of the upper-down frames 15a. The lower-down frames 15b can be selectable between a position extending downward from the upper-down frames 15a such that the front ends of the lower frames 33 are connected to the lower portions of the lower-down frames 15b by the connecting pins 35 and a position rotating forward with the lower portion of the lower-down frames 15b disconnected from the front ends of the lower frames 33, and are rotatably connected to the lower end portions of the upper-down frames 15a through the pins 26. Accordingly, in the disconnection state of the lower frames 33, by rotating forward the lower-down frames 15b of the down frames 15, the battery box 32 can be drawn out obliquely downward forward, such that it is possible to easily draw out the battery box 32.

Further, since at least portions of the lower frames 33 disposed inside from both sides in the width direction of the main battery box 32 overlap the lower portion of the main battery box 32 in the connection state of the lower frames 33 when seen from a side, it is prevented that the vehicle width is increased by disposing the lower frames 33 and the minimum height from the ground can be ensured. It is possible to compensate the amount of volume reduced by forming the recessed portions 32a at both lower sides of the battery box 32 to accommodate the lower frames 33 that are in the connection state, by extending upward the main battery 30 such that at least a portion of the upper end of the main battery 30 overlaps the main frame 14 when seen from a side.

Further, since the steps 38 disposed at both sides of the main battery 30 and the main battery box 32 when seen from above are provided at the front ends of the pair of left and right step-frames 37 overlapped by the rear portions of the main battery 30 and the main battery box 32 when seen from above, it is possible for the occupant to more comfortably place the feet without increasing the width between both step-frames 37.

Further, by disposing both steps 38, although the width of the main battery 30 has to be decreased where the occupant strides across on the occupant seat 28, the width of the main battery 30 is increased at the portion positioned further forward from both step-frames 37 and both steps 38. Accordingly, it is possible for the occupant to more comfortably place the feet, to considerably increase the capacity of the main battery box 32, and to increases the size of the main battery 30 by accommodating more cells 31 for a main battery in the main battery box 32.

Furthermore, since the bottom 41B of the battery 30 is formed to be stepped downward to the front portion, having a rear bottom 41a positioned above the step-frames 37 when seen from a side and a front bottom 41b positioned below the step-frames 38, it is possible to prevent the size of the main battery 30 from decreasing, while preventing the width between both step-frames 38 from increasing.

Figure 11:
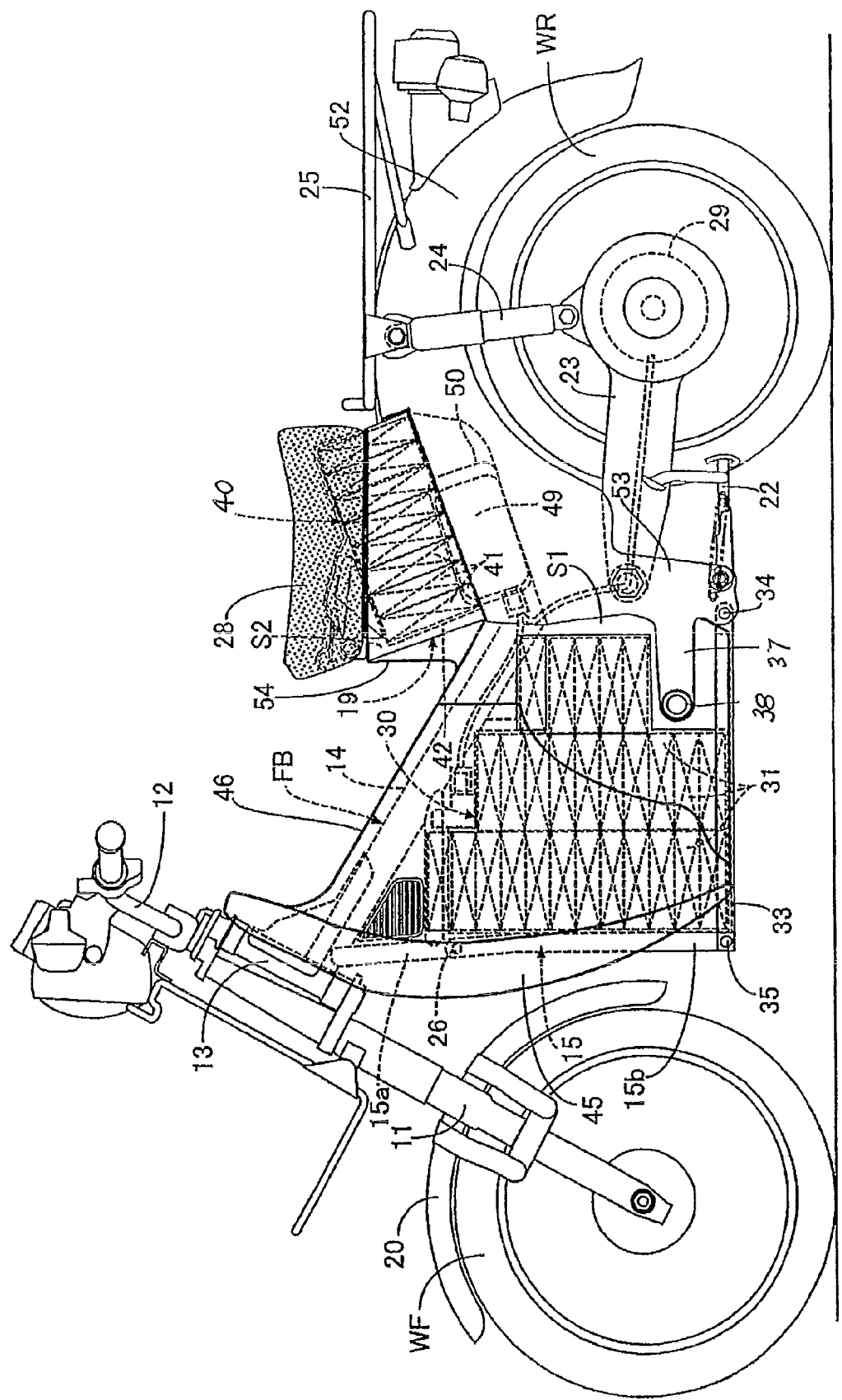
FIG. 11 is a left side view of a motorcycle according to another embodiment.

FIG. 11 shows another embodiment of the present invention, in which parts corresponding to those in the previous embodiments are designated by the same reference numerals and detailed description is not provided.

A vehicle body frame FB of a motorcycle includes a head pipe 13 steerably supporting a front fork 11 with a front wheel WF journaled to a lower end portion and a steering handlebar 12, a pipe-shaped main frame 14 extending downward and rearward from the head pipe 13, and a rear frame 52 that is separable to the left and right and is connected to the lower portion of the main frame 13. The rear frame 52 integrally has pivot frames 53 connected to the rear end of the main frame 14 and extending downward and has functions of a seat rail supporting an occupant seat 28 and a rear fender covering the rear wheel WR from above.

A pair of left right step-frames 37 that extends forward from the pivot frames 53 is connected to the lower portions of the pivot frames 53 and steps 38 where an occupant sitting on the occupant seat 28 to place the feet are provided at the front ends of the step-frames 37.

The rear wheel WR is journaled to the rear portion of a swing arm 23 swingably supported by the lower portion of the pivot frame 53 and an electric motor 29 generating power for rotatively driving the rear wheel WR is disposed with the rotational axis arranged coaxially with the rear wheel WR.

A main battery 30 supplying electric power to the electric motor 29 is composed of a plurality of cells 31 for a main battery, which is combined with each other, and accommodated in a main battery box 32, and the main battery box 32 is disposed in a first space S1 surrounded by a main frame 14, down frames 15 connected to the head pipe 13 or a front end portion of the main frame 14 (the front end portion of the main frame 14 in this embodiment) and extending downward, and the pivot frames 53, as in the previous embodiments, in which the upper surface of the main battery box 32 corresponds to the lower surface of the main frame 14 extending downward and rearward, and is formed to be gradually lowered to the front portion.

Further, the down frames 15 are composed of the upper-down frames 15a and the lower-down frames 15b connected by the pins 26 as in the previous embodiments, and lower frames 33, which is selectable between a connection state that supports the main battery box 32 by connecting the lower-down frames 15b of the down frames 15 with the pivot frames 53 and a disconnection state that allows the main battery box 32 to be drawn out downward by cutting the connection, are disposed between the lower portions of the pivot frames 53. Therefore, since the lower frames 33 can be selectable between the connection state where the front portions are connected to the down frames 15 and the disconnection state where the front portions are separated from the down frames 15, it is possible to draw out the main battery box 32 obliquely downward forward by rotating down the front portions of the lower frames 33 in the disconnection state, as in the previous embodiments.

Further, a sub-battery 40 that can supply electric power to the electric motor 29, instead of the main battery 30, is disposed in a second space S2 surrounded by the main frame 14 and the rear frame 52 functioning as the seat rails, under the occupant seat 28.

By the way, both left and right legs of the occupant sitting on the occupant seat 28 are covered by leg shields 45 from the front, and the leg shields 45 are integrally formed with a synthetic resin center cover 46 to cover the front portion of the main battery box 32 from both sides while covering the main frame 14 from above. On the other hand, the sub-battery box 42 is covered by a pair of left and right synthetic resin side covers 54 disposed under the occupant seat 28, from both sides, and the synthetic resin side covers 54 are connected to the center cover 46 and the rear frame 52.

In addition, driving circuit means 49 that receives electric power supplied from the main battery 30 and the sub-battery 40 and drives the electric motor 29 and charging circuit means 50 for charging the main battery 30 are accommodated inside the rear frame 52.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ride electric vehicle comprising:
   a head pipe steerably supporting a front fork with a front wheel journaled to a lower end portion and a steering handlebar;
   a main frame extending downward and rearward from the head pipe; and
   an electric motor generating power for rotatively driving a rear wheel,
   wherein: a battery supplying electric power to the electric motor is disposed in a space (S1) that is surrounded by a down frame connected to one of the head pipe or a front end portion of the main frame and extending downward, a pivot frame connected to a rear end portion of the main frame and extending downward, and the main frame; and
   the electric motor is disposed on a side of the rear wheel rather than the space (S1),
   wherein a plurality of cells is combined with each other to form the battery,
   wherein the cells are stacked one above the other in multiple vertical stacks,
   wherein a width of the stacks of the cells adjacent to the down frame is larger in a lateral direction of the vehicle than a width of the stacks of the cells adjacent to the pivot frame.

2. The saddle-ride electric vehicle according to claim 1, wherein a front end portion of a swing arm with the rear wheel journaled to a rear end portion is connected swingably up/down to the pivot frame, and the electric motor is disposed, with the rotational axis arranged coaxially with the rear wheel, at a rear end portion of the swing arm.

3. The saddle-ride electric vehicle according to claim 1, wherein the plurality of cells combined with each other to form the battery, is aligningly arranged in a battery box having an upper surface substantially corresponding to a lower surface of the main frame and disposed in the space (S1) that is surrounded by the main frame, the down frame, and the pivot frame, corresponding to a shape of the battery box.

4. The saddle-ride electric vehicle according to claim 3, wherein a lower frame, which is selectable between a connection state that supports the battery box by connecting the down frame with the pivot frames and a disconnection state that allows the main battery box to be drawn out downward by cutting the connection, is disposed between lower portions of the down frame and the pivot frame.

5. The saddle-ride electric vehicle according to claim 1, wherein the stacks of cells adjacent to the pivot frame are arranged directly between right and left steps where feet of a user of the vehicle are placed.

6. The saddle-ride electric vehicle according to claim 1, further comprising:
driving circuit means that receives electric power supplied from the battery and drives the electric motor is accommodated in a side cover that is disposed under an occupant seat disposed above a seat rail, which is connected to the main frame and extends rearward, and covers the seat rail from a side.

7. The saddle-ride electric vehicle according to claim 6, wherein the driving circuit means is accommodated in one side cover of the pair of left and right side covers; and
charging circuit means for charging the battery is accommodated in the other side cover of both side covers.

8. The saddle-ride electric vehicle according to claim 7, wherein the driving circuit means and the charging circuit means are disposed substantially inside in a width direction of the occupant seat, when seen from above.

9. The saddle-ride electric vehicle according to claim 7, wherein the driving circuit means and the charging circuit means are disposed in a space surrounded by the main frame, the occupant seat, and a rear frame.

10. The saddle-ride electric vehicle according to claim 1, wherein the battery cells are arranged in a battery box having front and rear sides walls which extend in a vertical direction, and an upper wall having multiple horizontal sections arranged in a stair-step manner.

11. The saddle-ride electric vehicle according to claim 1, wherein the battery supplying electric power to the electric motor is disposed in the space (S1) such that at least a portion of the upper end of the battery overlaps the main frame when seen from a side.

12. The saddle-ride electric vehicle according to claim 1, wherein a height of the stacks of cells adjacent to the down frame is extends is greater in a vertical direction of the vehicle than a height of the stacks of cells adjacent to the pivot frame.

13. The saddle-ride electric vehicle according to claim 1, wherein a step where an occupant sitting on an occupant seat places feet is provided at the front end of a pair of left and right step-frames, which is connected to the lower portion of the pivot frame while extending forward, and overlapped by the rear portion of the battery when seen from above, is positioned at both sides of the battery when seen from above; and
a bottom of the battery is formed to be stepped downward to the front portion, having a rear bottom disposed above the step-frames when seen from a side and a front bottom disposed under the step-frames between the steps and the down frames.

14. A saddle-ride electric vehicle comprising:
a head pipe steerably supporting a front fork with a front wheel journaled to a lower end portion and a steering handlebar;
a main frame extending downward and rearward from the head pipe; and
an electric motor generating power for rotatively driving a rear wheel,
wherein a battery supplying electric power to the electric motor is disposed in a space (S1) that is surrounded by a down frame connected to one of the head pipe or a front end portion of the main frame and extending downward, a pivot frame connected to a rear end portion of the main frame and extending downward, and the main frame; and
the electric motor is disposed on a side of the rear wheel rather than the space (S1),
wherein the down frame extends in a direction that is substantially perpendicular to a longitudinal direction of the vehicle
wherein a plurality of cells is combined with each other to form the battery,
wherein the cells are stacked one above another in multiple vertical stacks,
wherein a height of the stacks of the cells adjacent to the down frame is greater in a vertical direction of the vehicle than a height of the stacks of the cells adjacent to the pivot frame.

15. The saddle-ride electric vehicle according to claim 14, wherein a width of the stacks of cells adjacent to the down frame is larger in a lateral direction of the vehicle than a width of the stacks of cells adjacent to the pivot frame.

16. The saddle-ride electric vehicle according to claim 15, wherein the down frame has an upper-down frame of which the upper end portion is connected to the head pipe or the front end portion of the main frame and a lower-down frame of which the upper end portion is connected to the lower end portion of the upper-down frame; and
the lower-down frame can be selectable between a position extending downward from the upper-down frame such that the front portion of the lower frame is connected to the lower portion of the lower-down frame and a position rotating forward with the lower portion of the lower-down frames disconnected from the front portion of the lower frames, and is rotatably connected to the upper-down frame.

17. The saddle-ride electric vehicle according to claim 16, wherein at least a portion of the lower frame overlaps the lower portion of the battery box in the connection state of the lower frame when seen from a side; and
the lower frame is disposed inside from both sides in a width direction of the battery box.

18. The saddle-ride electric vehicle according to claim 14, wherein a front end portion of a swing arm with the rear wheel journaled to a rear end portion is connected swingably up/down to the pivot frame, and the electric motor is disposed, with the rotational axis arranged coaxially with the rear wheel, at a rear end portion of the swing arm.

19. The saddle-ride electric vehicle according to claim 14, further comprising:
driving circuit means that receives electric power supplied from the battery and drives the electric motor is accommodated in a side cover that is disposed under an occupant seat disposed above a seat rail, which is connected to the main frame and extends rearward, and covers the seat rail from a side.

20. The saddle-ride electric vehicle according to claim 14, wherein the battery cells are arranged in a battery box having front and rear sides walls which extend in a vertical direction, and an upper wall having multiple horizontal sections arranged in a stair-step manner.

* * * * *